(12) United States Patent
Gusikhin et al.

(10) Patent No.: US 11,347,243 B2
(45) Date of Patent: May 31, 2022

(54) VEHICLE INSPECTION SYSTEMS AND METHODS

(71) Applicant: Ford Global Technologies, LLC, Dearborn, MI (US)

(72) Inventors: Oleg Yurievitch Gusikhin, Dearborn, MI (US); Bruno Sielly Jales Costa, Dearborn, MI (US); Madeline J. Goh, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 269 days.

(21) Appl. No.: 16/634,766

(22) PCT Filed: Aug. 8, 2017

(86) PCT No.: PCT/US2017/045924
§ 371 (c)(1),
(2) Date: Jan. 28, 2020

(87) PCT Pub. No.: WO2019/032097
PCT Pub. Date: Feb. 14, 2019

(65) Prior Publication Data
US 2020/0209891 A1    Jul. 2, 2020

(51) Int. Cl.
| G05D 1/10 | (2006.01) |
| B64C 39/02 | (2006.01) |
| B64D 47/08 | (2006.01) |
| G06V 10/143 | (2022.01) |
| G06V 20/59 | (2022.01) |

(52) U.S. Cl.
CPC ............ *G05D 1/101* (2013.01); *B64C 39/024* (2013.01); *B64D 47/08* (2013.01); *G06V 10/143* (2022.01); *G06V 20/59* (2022.01); *B64C 2201/027* (2013.01); *B64C 2201/127* (2013.01); *B64C 2201/141* (2013.01)

(58) Field of Classification Search
CPC .................. G05D 1/101; B64C 39/024; B64C 2201/027; B64C 2201/127; B64C 2201/141; B64D 47/08; G06K 9/00832; G06K 9/2018
See application file for complete search history.

(56) References Cited

U.S. PATENT DOCUMENTS

| 7,688,225 B1 | 3/2010 | Haynes et al. |
| 9,056,676 B1 * | 6/2015 | Wang .................. G01C 21/3697 |

(Continued)

FOREIGN PATENT DOCUMENTS

WO    WO-2020220185 A1 *    11/2020    ............. G01N 21/01

OTHER PUBLICATIONS

International Search Report of the International Searching Authority for PCT/US2017/045924 dated Dec. 5, 2017.

*Primary Examiner* — Peter D Nolan
*Assistant Examiner* — Kenneth M Dunne
(74) *Attorney, Agent, or Firm* — Brandon Hicks; Eversheds Sutherland (US) LLP

(57) ABSTRACT

In one implementation, a method activates an unmanned aircraft inside a vehicle to capture images of the vehicle interior. The method accesses a flight path for the unmanned aircraft and receives data associated with the vehicle's current movement. The method adjusts the flight path of the unmanned aircraft to compensate for the vehicle's current movement.

15 Claims, 8 Drawing Sheets

(56) References Cited

U.S. PATENT DOCUMENTS

| | | | |
|---|---|---|---|
| 11,145,043 B2* | 10/2021 | Myers | H04N 7/18 |
| 2015/0302669 A1 | 10/2015 | Gonnsen et al. | |
| 2016/0034809 A1 | 2/2016 | Trenholm et al. | |
| 2016/0132714 A1 | 5/2016 | Pennypacker et al. | |
| 2017/0049288 A1 | 2/2017 | Knutson et al. | |
| 2017/0057081 A1 | 3/2017 | Krohne et al. | |
| 2017/0121019 A1 | 5/2017 | Shin et al. | |
| 2017/0177938 A1* | 6/2017 | Papanikolopoulos | G06T 7/90 |
| 2017/0202185 A1 | 7/2017 | Trumbull et al. | |
| 2017/0316701 A1* | 11/2017 | Gil | B64D 45/04 |
| 2018/0089622 A1* | 3/2018 | Burch, V | G06Q 50/30 |
| 2018/0265296 A1* | 9/2018 | Beckman | G06Q 10/083 |
| 2018/0307926 A1* | 10/2018 | Tokatyan | G06V 20/59 |
| 2018/0330475 A1* | 11/2018 | Tokatyan | G06K 9/6267 |
| 2019/0004543 A1* | 1/2019 | Kennedy | H04N 5/2258 |
| 2019/0031343 A1* | 1/2019 | Russell | B08B 13/00 |
| 2019/0139328 A1* | 5/2019 | Yoshizaki | G06V 20/52 |
| 2019/0380547 A1* | 12/2019 | Turpin | G05D 1/0088 |
| 2021/0192559 A1* | 6/2021 | Saiki | B60S 5/00 |
| 2021/0194960 A1* | 6/2021 | Ventimiglia | G07C 5/085 |

* cited by examiner

VEHICLE INSPECTION SYSTEMS AND METHODS

TECHNICAL FIELD

The present disclosure relates to vehicular systems and, more particularly, to systems and methods that inspect the interior of a vehicle.

BACKGROUND

Automobiles and other vehicles provide a significant portion of transportation for commercial, government, and private entities. Vehicles, such as autonomous vehicles, drive on roadways, parking lots, and other areas when transporting passengers or objects from one location to another. An example application of autonomous vehicles is operating as a taxi or shuttle service that picks up one or more passengers in response to a transportation request. When operating as a taxi or shuttle service, the autonomous vehicle drives to a pickup location such that a passenger requesting the service can enter the vehicle. The vehicle then drives to a destination and allows the passenger to exit the vehicle. Before picking up another passenger, it is preferable that the vehicle interior is clean for the next passenger.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
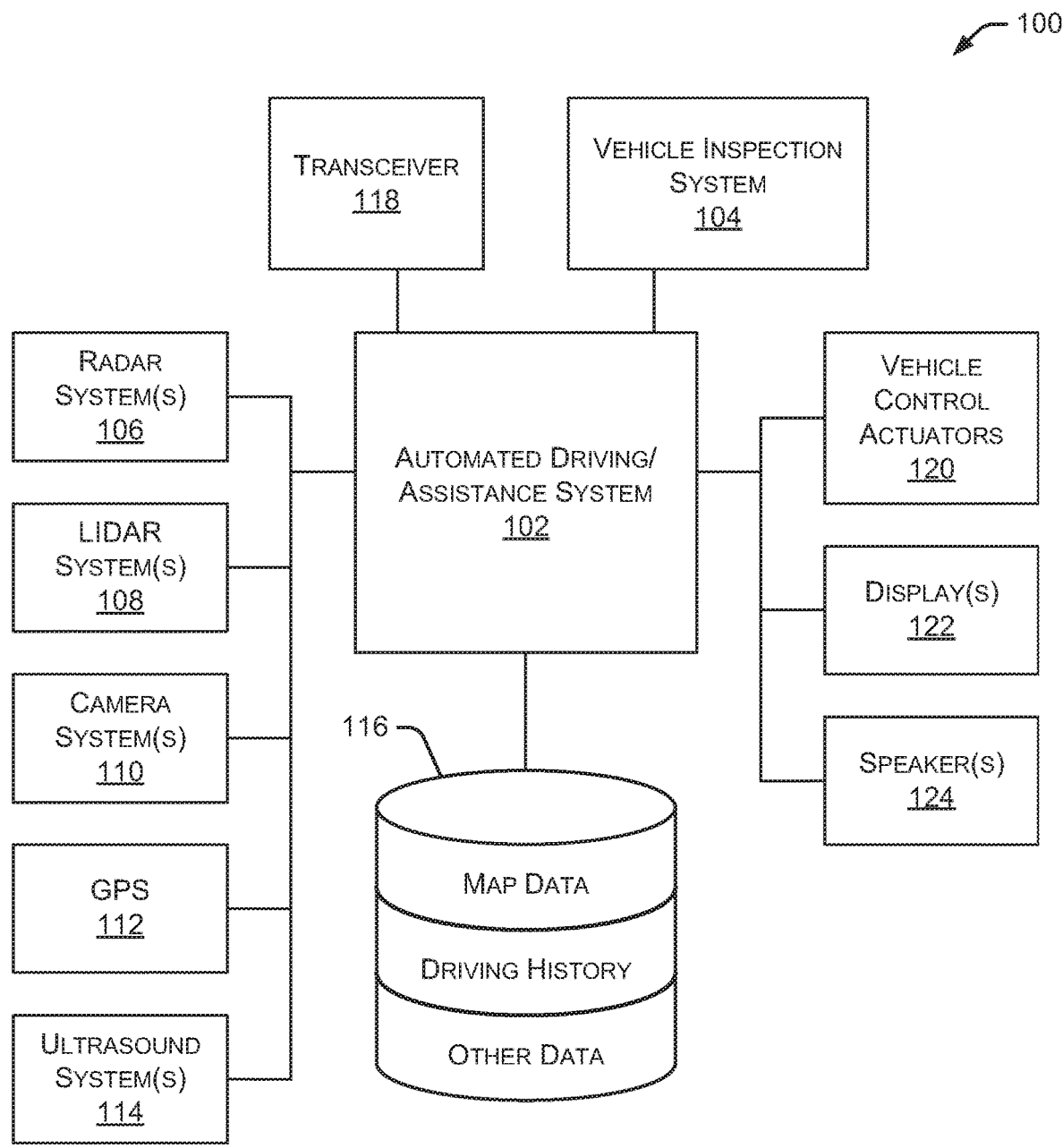
FIG. 1 is a block diagram illustrating an embodiment of a vehicle control system that includes a vehicle inspection system.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

FIG. 1 is a block diagram illustrating an embodiment of a vehicle control system 100 within a vehicle that includes a vehicle inspection system 104. An automated driving/assistance system 102 may be used to automate or control operation of a vehicle or to provide assistance to a human driver. For example, the automated driving/assistance system 102 may control one or more of braking, steering, seat belt tension, acceleration, lights, alerts, driver notifications, radio, vehicle locks, or any other auxiliary systems of the vehicle. In another example, the automated driving/assistance system 102 may not be able to provide any control of the driving (e.g., steering, acceleration, or braking), but may provide notifications and alerts to assist a human driver in driving safely. Vehicle control system 100 includes vehicle inspection system 104 that interacts with various components in the vehicle to inspect the vehicle's interior for stains, dirt, trash, and other items inside the vehicle. Although vehicle inspection system 104 is shown as a separate component in FIG. 1, in alternate embodiments, vehicle inspection system 104 may be incorporated into automated driving/assistance system 102 or any other vehicle component.

Vehicle control system 100 also includes one or more sensor systems/devices for detecting a presence of nearby objects (or obstacles) or determining a location of a parent vehicle (e.g., a vehicle that includes vehicle control system 100). For example, vehicle control system 100 may include one or more Radar (Radio detection and ranging) systems 106, one or more Lidar (Light detection and ranging) systems 108, one or more camera systems 110, a global positioning system (GPS) 112, and/or ultrasound systems 114. The one or more camera systems 110 may include a rear-facing camera mounted to the vehicle (e.g., a rear portion of the vehicle), a front-facing camera, and a side-facing camera. Camera systems 110 may also include one or more interior cameras that capture images of the vehicle's interior, such as dirt, trash, stains, and other objects inside the vehicle. Lidar systems 108 may include one or more interior Lidar sensors that capture data associated with the area inside the vehicle. Vehicle control system 100 may include a data store 116 for storing relevant or useful data for navigation and safety, such as map data, driving history, or other data. Vehicle control system 100 may also include a transceiver 118 for wireless communication with a mobile or wireless network, other vehicles, infrastructure, or any other communication system.

Vehicle control system 100 may include vehicle control actuators 120 to control various aspects of the driving of the vehicle such as electric motors, switches or other actuators, to control braking, acceleration, steering, seat belt tension, door locks, or the like. Vehicle control system 100 may also include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. Speakers 124 may include one or more speakers of a sound system of a vehicle or may include a speaker dedicated to driver or passenger notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, automated driving/assistance system 102 is configured to control driving or navigation of a parent vehicle. For example, automated driving/assistance system 102 may control the vehicle control actuators 120 to drive a path on a road, parking lot, driveway or other location. For example, automated driving/assistance system 102 may determine a path based on information or perception data provided by any of the components 106-118. A path may also be determined based on a route that maneuvers the vehicle to avoid or mitigate a potential collision with another vehicle or object. The sensor systems/devices 106-110 and 114 may be used to obtain real-time sensor data so that automated driving/assistance system 102 can assist a driver or drive a vehicle in real-time.

Figure 2:
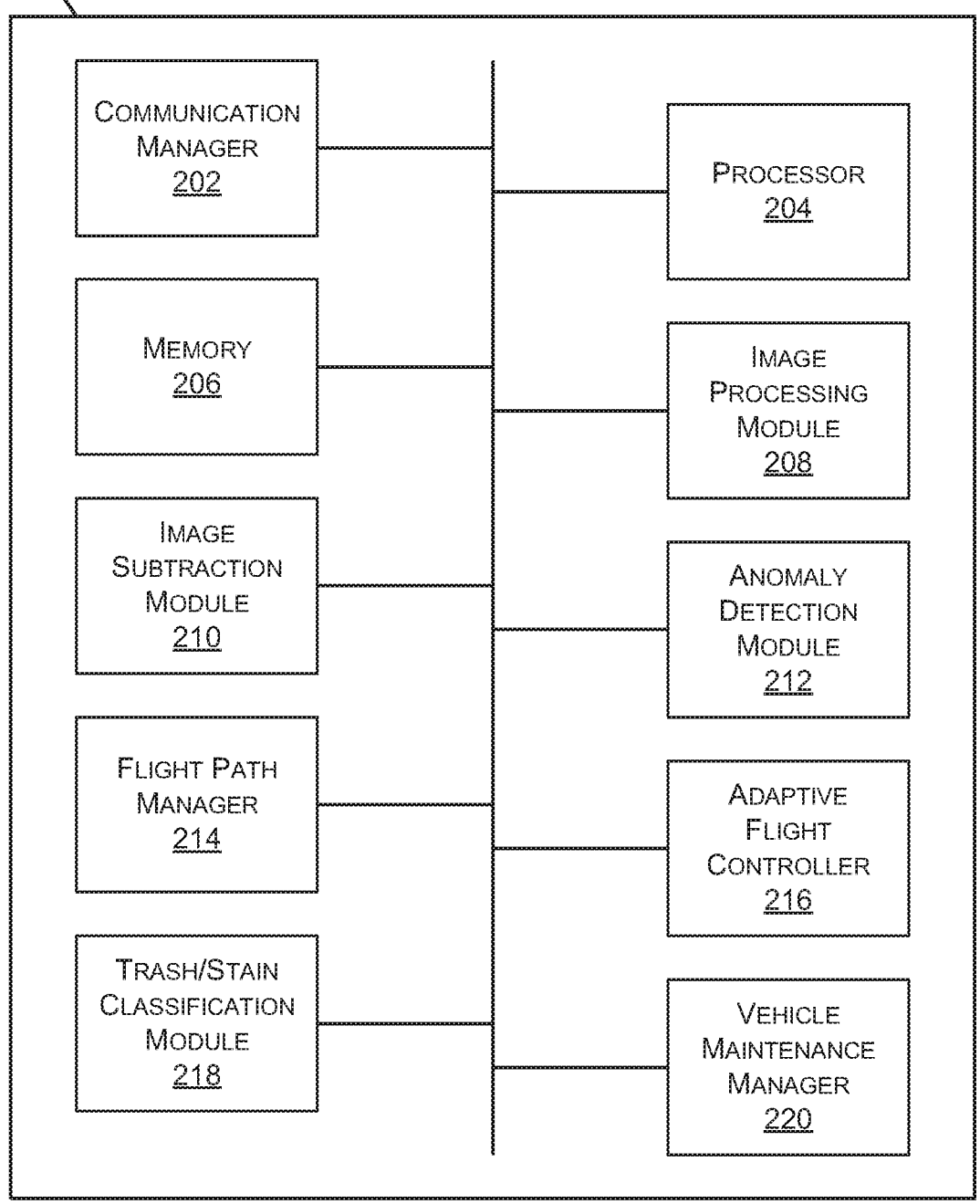
FIG. 2 is a block diagram illustrating an embodiment of a vehicle inspection system.

FIG. 2 is a block diagram illustrating an embodiment of vehicle inspection system 104. As shown in FIG. 2, vehicle inspection system 104 includes a communication manager 202, a processor 204, and a memory 206. Communication manager 202 allows vehicle inspection system 104 to communicate with other systems, such as automated driving/assistance system 102. Processor 204 executes various instructions to implement the functionality provided by vehicle inspection system 104, as discussed herein. Memory 206 stores these instructions as well as other data used by processor 204 and other modules and components contained in vehicle inspection system 104.

Additionally, vehicle inspection system 104 includes an image processing module 208 that receives image data from one or more camera systems 110. Vehicle inspection system 104 may also receive images from an unmanned aircraft inside the vehicle. The unmanned aircraft includes one or more cameras to capture images of the interior of the vehicle. In particular implementations, the unmanned aircraft includes at least one RGB (Red, Green, and Blue) camera and at least one IR (Infrared) camera. In some embodiments, the images captured by the unmanned aircraft's camera are wirelessly communicated to vehicle inspection system 104. The unmanned aircraft includes any type of aircraft or device capable of flight that can navigate without a human pilot on board. For example, an unmanned aircraft may be self-piloted (e.g., autonomous) or remotely controlled by another system or operator. In some implementations, the unmanned aircraft is a small drone, such as a nano drone, a mini drone, a micro drone, and the like. The unmanned aircraft, as discussed in greater detail below, is small enough to fly around the interior of the vehicle. In some embodiments, the unmanned aircraft can be stored within a vehicle compartment (e.g., a glove box) when not in use. As used herein, the unmanned aircraft may also be referred to as an unmanned aerial vehicle (UAV), an unmanned aerial system, or an unmanned aerial device.

In some embodiments, image processing module 208 includes an image management algorithm or process that manages one or more clean images that represent images of the vehicle interior when it is clean (e.g., no stains, dirt, trash, or other items in the vehicle). Additionally, image processing module 208 may manage one or more additional images that are captured after a passenger has exited the vehicle. As discussed herein, these additional images (also referred to as "current images") are compared to the clean images to determine whether the vehicle interior has a stain, trash, dirt, or other item as a result of the passenger traveling in the vehicle.

Vehicle inspection system 104 also includes an image subtraction module 210 that subtracts the additional images (e.g., the current images) from the clean images to identify differences between the images. These differences may represent stains, dirt, trash, or other items left behind by the previous passenger. An anomaly detection module 212 identifies one or more anomalies based on an analysis of the differences between the current images and the clean images. These anomalies may include, for example, stains, dirt, trash, or other items left behind by the previous passenger.

A flight path manager 214 controls the movement and flight path of the unmanned aircraft within the vehicle. In some embodiments, the unmanned aircraft may follow a pre-defined flight path that allows the unmanned aircraft's camera to capture images of the vehicle's interior to check all areas for stains, dirt, trash, or other items. Flight path manager 214 may communicate wirelessly with the unmanned aircraft to control the aircraft's path inside the vehicle. In some embodiments, flight path manager 214 also instructs the unmanned aircraft when to capture images of the vehicle's interior.

An adaptive flight controller 216 identifies movement of the vehicle while the unmanned aircraft is flying inside the vehicle and adjusts the aircraft's flight path, if necessary, to compensate for the movement of the vehicle. Additional details regarding adjusting the flight path based on vehicle movement are provided herein. A trash/stain classification module 218 detects locations and types of stains, dirt, trash, and other items in the vehicle based on the captured images. For example, trash/stain classification module 218 analyzes the identified differences between the current and clean images to classify the type of trash or stain. For example, a particular anomaly may be classified as a liquid stain, a piece of trash, or a dirt on the floor or a seating surface.

A vehicle maintenance manager 220 manages the cleaning and maintenance of the vehicle. For example, if a stain, dirt, trash, or other item is detected in the vehicle after a passenger has exited the vehicle, vehicle maintenance manager 220 may determine whether the vehicle needs to be removed from service before accepting the next passenger. If cleaning is required, vehicle maintenance manager 220 may instruct automated driving/assistance system 102 to drive the vehicle to the nearest cleaning or service facility. Vehicle maintenance manager 220 may consider the size or classification of the detected stain, dirt, trash, or other item when determining whether cleaning is required. Additionally, if cleaning is required, vehicle maintenance manager 220 may determine what kind of cleaning is necessary.

Figure 3:
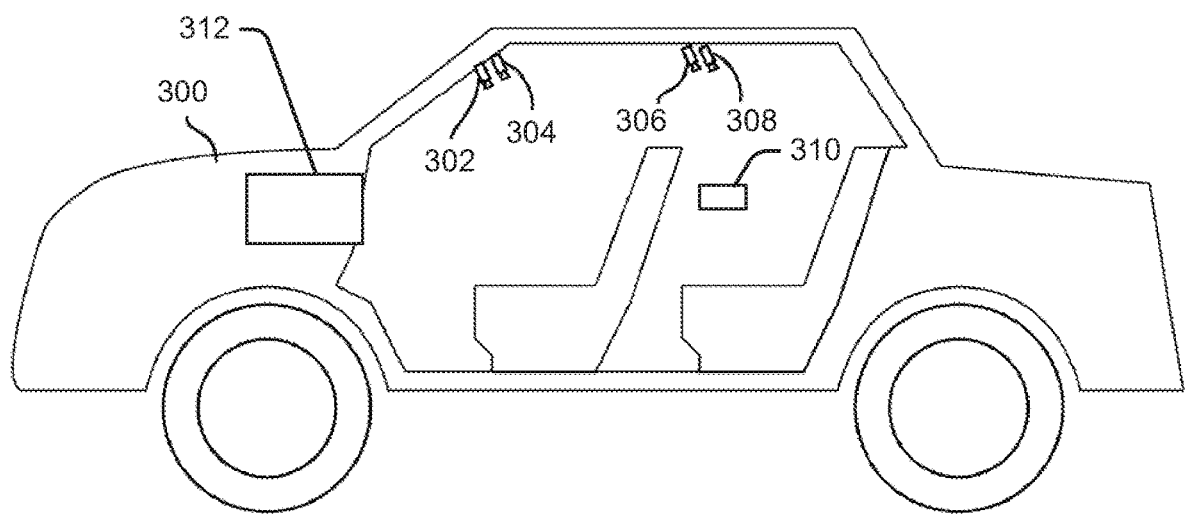
FIG. 3 illustrates an embodiment of a vehicle with multiple interior cameras and an unmanned aircraft inside the vehicle.

FIG. 3 illustrates an embodiment of a vehicle 300 with multiple interior cameras and an unmanned aircraft inside the vehicle. As shown in FIG. 3, vehicle 300 has four interior cameras 302, 304, 306, and 308. In some embodiments, cameras 302-308 are positioned and oriented in vehicle 300 such that all seating surfaces (e.g., seat bottoms and seat backs) are in the field of view of at least one camera 302-308. Other areas of the interior of vehicle 300, such as the vehicle floor, may also be in the field of view of one or more cameras 302-308.

Additionally, an unmanned aircraft 310 is shown in FIG. 3 as flying inside vehicle 300. As discussed herein, unmanned aircraft 310 includes one or more cameras (such as an RGB camera and an IR camera) that capture images of the interior of vehicle 300 as unmanned aircraft 310 flies throughout the vehicle interior. Unmanned aircraft 310 can fly in any accessible area of the vehicle interior to capture images, which are analyzed to identify dirt, stains, trash, and other objects in vehicle 300. In some embodiments, unmanned aircraft 310 is activated to fly throughout the interior of vehicle 300 after one or more passengers have exited vehicle 300. A vehicle compartment 312 provides a storage location for unmanned aircraft 310 when not in use. For example, vehicle compartment 312 may be a glove box or other compartment in vehicle 300. In some embodiments, unmanned aircraft 310 is recharged while located in vehicle compartment 312.

Although four interior cameras 302-308 are shown in FIG. 3, in alternate embodiments, vehicle 300 may have any number of interior cameras positioned in various locations throughout the vehicle and aimed at different angles. Additionally, although one unmanned aircraft 310 is shown in FIG. 3, in alternate embodiments, vehicle 300 may include any number of unmanned aircraft 310 flying inside the vehicle.

Figure 4:
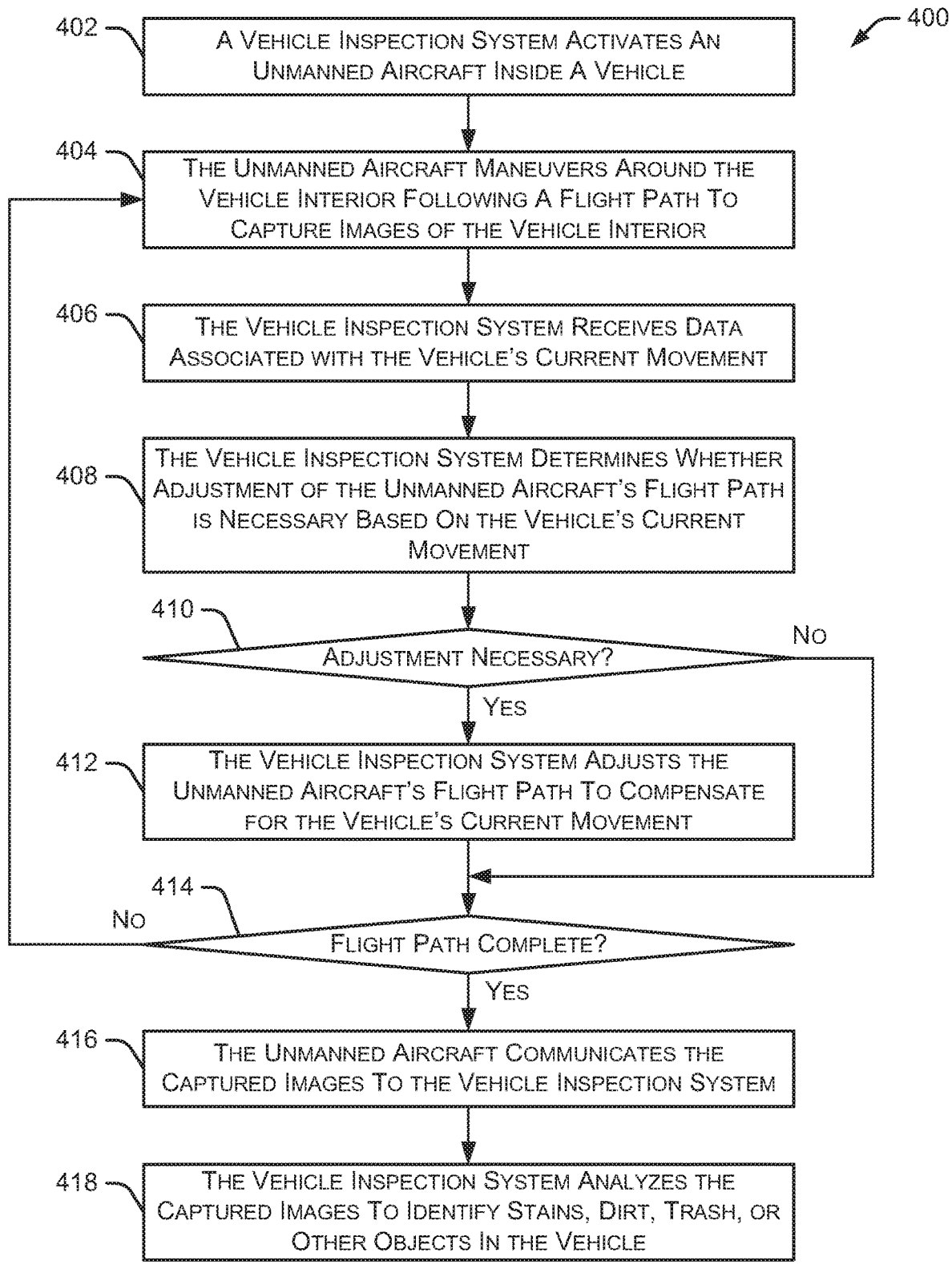
FIG. 4 illustrates an embodiment of a method for inspecting an interior a vehicle using an unmanned aircraft.

FIG. 4 illustrates an embodiment of a method 400 for inspecting an interior a vehicle using an unmanned aircraft. Initially, a vehicle inspection system activates 402 an unmanned aircraft inside a vehicle. For example, when one or more passengers exit vehicle 300, unmanned aircraft 310 may be released from vehicle compartment 312 to inspect the vehicle's interior for stains, dirt, trash, or other objects left behind by the previous passenger. The unmanned aircraft maneuvers 404 around the vehicle interior following a flight path to capture images of the vehicle interior. In some embodiments, the flight path allows the cameras on the unmanned aircraft to capture images of all relevant portions of the vehicle interior (e.g., all areas likely to have stains, dirt, trash, or other objects left behind by the previous passenger).

In some implementations, the unmanned aircraft maneuvers around the vehicle interior while the vehicle is driving to another location. As the unmanned aircraft maneuvers around the vehicle interior, the vehicle inspection system receives 406 data associated with the vehicle's current movement. The data associated with the vehicle's current movement includes, for example, data regarding acceleration of the vehicle, deceleration of the vehicle, or turning of the vehicle (including the direction of the turn). The vehicle inspection system then determines 408 whether the unmanned aircraft's flight path needs to be adjusted based on the vehicle's current movement. Movement of the vehicle can alter the unmanned aircraft's flight path because vehicle movement can cause the air in the vehicle to move which can "push" the unmanned aircraft in different directions. For example, if a vehicle decelerates, the air inside the vehicle moves forward (e.g., toward the front of the cabin). This forward movement of the air may "push" the unmanned aircraft forward because the unmanned aircraft is in the air flow that's moving toward the front of the vehicle. Other vehicle movements can "push" the unmanned aircraft in different directions. For example, acceleration of the vehicle may "push" the unmanned aircraft toward the back of the vehicle cabin, and turns to the right or left may "push" the unmanned aircraft to the right or left side of the vehicle cabin, respectively. Additional details regarding how the system determines 408 whether to adjust the flight path are discussed herein and in particular with respect to FIG. 5.

If a flight path adjustment is necessary 410, the vehicle inspection system adjusts 412 the unmanned aircraft's flight path to compensate for the vehicle's current movement. The flight path adjustment is important to prevent the unmanned aircraft from flying into a seat, window, or other vehicle surface. Also, to ensure the unmanned aircraft is capturing images from pre-defined locations, the unmanned aircraft needs to follow the pre-defined flight plan. In some embodiments, the vehicle inspection system communicates the adjusted flight path to the unmanned aircraft via a wireless communication link. If no flight path adjustment is necessary 410, the method determines whether the flight path is complete 414. If the flight path is not complete, the method returns to 404 where the unmanned aircraft continues maneuvering around the vehicle interior by following the flight path.

If the flight path is complete at 414, the unmanned aircraft communicates 416 the captured images to the vehicle inspection system. In some embodiments, the unmanned aircraft communicates the images to the vehicle inspection system as the unmanned aircraft maneuvers around the vehicle interior. For example, the unmanned aircraft may communicate images to the vehicle inspection system as the images are captured by the cameras mounted to the unmanned aircraft. Additionally, the unmanned aircraft returns to the vehicle compartment for storage and, in some embodiments, charging of a battery or other power source in the unmanned aircraft. Finally, the vehicle inspection system analyzes 418 the captured images to identify stains, dirt, trash, or other objects in the vehicle. Additional details regarding how the system identify stains, dirt, trash, or other objects in the vehicle are discussed herein and in particular with respect to FIG. 6.

In some embodiments, the flight path of the unmanned aircraft can be modified to avoid obstacles in the cabin of the vehicle and obtain additional details regarding a particular portion of the vehicle's interior. For example, if an initial analysis of a captured image indicates a stain, dirt, trash, or other object, the unmanned aircraft may return to that location in the vehicle to take capture additional images, such as close-up images or images taken from a different perspective to better analyze or classify the stain, dirt, trash, or other object. In some embodiments, the vehicle inspection system communicates one or more of the captured images to a remote location with more powerful computing resources and/or human users who can further analyze the identify stains, dirt, trash, or other objects in the vehicle, and determine what type of cleaning or vehicle service is needed before picking up a new passenger.

Figure 5:
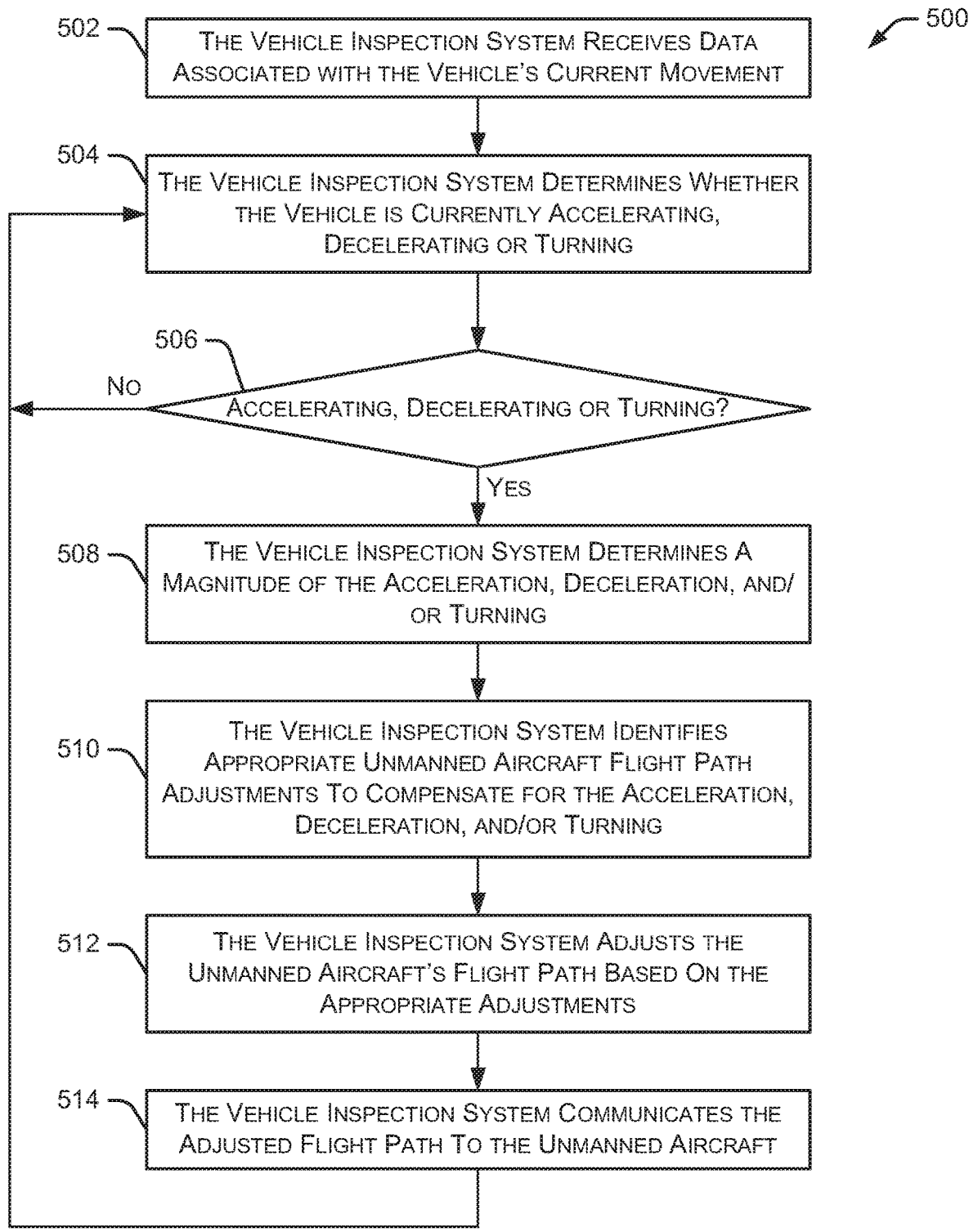
FIG. 5 illustrates an embodiment of a method for adjusting a flight path of an unmanned aircraft.

FIG. 5 illustrates an embodiment of a method 500 for adjusting a flight path of an unmanned aircraft. Initially, the vehicle inspection system receives 502 data associated with the vehicle's current movement. As mentioned above, the vehicle's movement may include acceleration of the vehicle, deceleration of the vehicle, or turning of the vehicle (including the direction of the turn). In some embodiments, the systems and methods discussed herein may also consider vehicle movement changes as the vehicle moves up or down a hill, or other roadway situation where the elevation of the vehicle is changing. The vehicle inspection system determines 504 whether the vehicle is currently accelerating, decelerating or turning based on, for example, data from vehicle control inputs (accelerator pedal, brake pedal), an accelerometer, a gyroscope, and the like. In some embodiments, the vehicle inspection system determines 504 whether the vehicle is currently accelerating, decelerating or turning based on data from automated driving/assistance system 102. When driving in an autonomous mode, automated driving/assistance system 102 can provide data regarding the inputs being provided to vehicle control actuators and other vehicle systems that indicate that the vehicle is (or will soon be) accelerating, decelerating or turning.

If the vehicle is not accelerating, decelerating or turning at 506, the method returns to 504, where the vehicle inspection system continues determining whether the vehicle is accelerating, decelerating or turning. In this situation, the vehicle may be considered to be in a steady state (i.e., not accelerating, decelerating or turning). If, at 506, the vehicle is performing one or more movement (e.g., accelerating, decelerating, and/or turning), the vehicle inspection system determines 508 a magnitude of the acceleration, deceleration, and/or turning. The vehicle inspection system then identifies 510 appropriate unmanned aircraft flight path adjustments to compensate for the vehicle's acceleration, deceleration, and/or turning. The amount of adjustment needed may vary depending on the magnitude of the acceleration, deceleration, and/or turning.

Method 500 continues as the vehicle inspection system adjusts 512 the unmanned aircraft's flight path based on the appropriate adjustments determined above. The vehicle inspection system communicates 514 the adjusted flight path to the unmanned aircraft via, for example, a wireless communication link. The unmanned aircraft adjusts its operation based on the adjusted flight path, which should allow the unmanned aircraft to more accurately follow its pre-defined flight path that allows the unmanned aircraft's cameras to capture images of the vehicle's interior to check all areas for stains, dirt, trash, or other items. After communicating 514 the adjusted flight path to the unmanned aircraft, method 500 returns to 504 to continue determining whether the vehicle is accelerating, decelerating or turning.

In some embodiments, the unmanned aircraft is capable of independently determining its location within the vehicle cabin. Although the unmanned aircraft may receive flight control (or flight path) instructions from a vehicle inspection system (or other system), the unmanned aircraft can determine its location within the vehicle based on visual cues from, for example, images captured by the camera of the unmanned aircraft. In some embodiments, the visual cues are associated with predefined points or predefined locations within the vehicle. When the unmanned aircraft identifies one of these predefined points, the unmanned aircraft can determine (or at least approximate) its location within the vehicle based on the location of the predefined point within a captured image and the known angle or perspective from which the unmanned aircraft captured that image. Example predefined points include objects or items that generally have a fixed location, such as the steering wheel, a company logo in the middle of the steering wheel, seat belt receivers, door handles, vents, head rests, and the like. In some implementations, the predefined points are specific markers or codes within the vehicle, such as bar codes, ArUco markers, and the like. Since the unmanned aircraft is moving within the vehicle, a technique such as "Structure from Motion" (SfM) can be used to estimate the unmanned aircraft's location within the vehicle. In some implementations, the unmanned aircraft uses one or more other sensors to assist in determining the location of the unmanned aircraft within the vehicle. In some embodiments, the unmanned aircraft communicates its current location to a vehicle inspection system, thereby allowing the vehicle inspection system to confirm the location of the unmanned aircraft on the flight path. If the unmanned aircraft is not on the correct flight path, an appropriate adjustment may be communicated from the vehicle inspection system to the unmanned aircraft.

Figure 6:
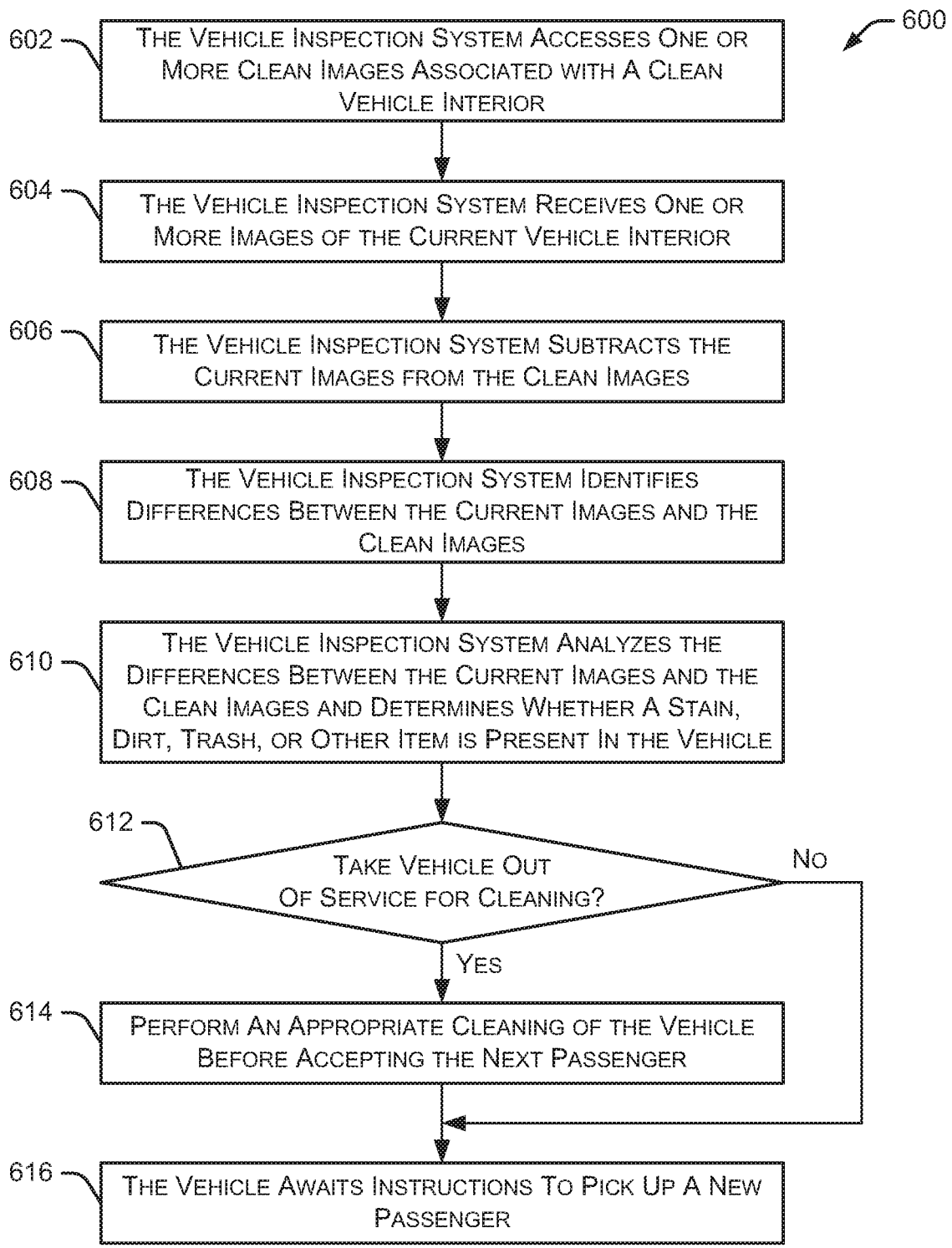
FIG. 6 illustrates an embodiment of a method for detecting a stain or trash in a vehicle.

FIG. 6 illustrates an embodiment of a method 600 for detecting a stain or trash in a vehicle. Initially, the vehicle inspection system accesses 602 one or more clean images associated with a clean vehicle interior. These clean images are captured when the vehicle has no stains, dirt, trash, or other items left in the vehicle. In some embodiments, the clean images are captured from a particular location and angle within the vehicle. For example, the clean images may be captured by one or more cameras mounted at specific locations within the vehicle. Additionally, some (or all) of the clean images may be captured by an unmanned aircraft at specific locations along a flight path within the vehicle. The vehicle inspection system also receives 604 one or more images of the current vehicle interior (referred to as the "current images"). The current images may be captured by one or more cameras mounted in the vehicle and/or cameras mounted to the unmanned aircraft maneuvering within the vehicle.

Method 600 continues as the vehicle inspection system subtracts 606 the current images from the clean images. This subtraction process identifies 608 differences between the current images and the clean images. These differences may represent stains, dirt, trash, or other objects left by a previous passenger. The vehicle inspection system analyzes 610 the differences between the current images and the clean images, and determines whether a stain, dirt, trash, or other item is present in the vehicle. In some embodiments, the analysis of the differences between the current images and the clean images identifies one or more contours in the identified differences. The contours include, for example, the outline of stains, dirt, trash, or other items. Based on the shape of the contour and the smoothness of the contour edges, the vehicle inspection system determines the type of stain, dirt, trash, or other item in the images. For example, if the contour is substantially round with smooth edges, it is likely a stain. However, if the contour has an irregular shape and/or sharp/jagged edges, it is more likely to be a piece of trash or other item left in the vehicle by a previous passenger. Based on the analysis and determination of a stain, dirt, trash, or other object, the method determines 612 whether the vehicle should be taken out of service for cleaning. In particular, the method determines whether the vehicle needs to be cleaned before allowing another passenger to enter the vehicle. This determination regarding whether the vehicle needs to be cleaned may include determining the size of the stain, dirt, trash, or other item. For example, a small piece of trash on the floor may not require vehicle cleaning, but a significant stain on the seat would likely require cleaning of the vehicle.

If the vehicle needs to be taken out of service for cleaning 612, an appropriate cleaning of the vehicle is performed 614 before accepting the next passenger. This cleaning may be performed by a mobile cleaning service or performed at a vehicle cleaning and/or servicing facility depending on the amount of cleaning necessary and the vehicle's proximity to a mobile cleaning service and/or a cleaning/servicing facility. After the vehicle is cleaned (or if the vehicle does not need cleaning), the vehicle is made available to pick up a new passenger and awaits instructions 616 to pick up the next passenger.

Figure 7:
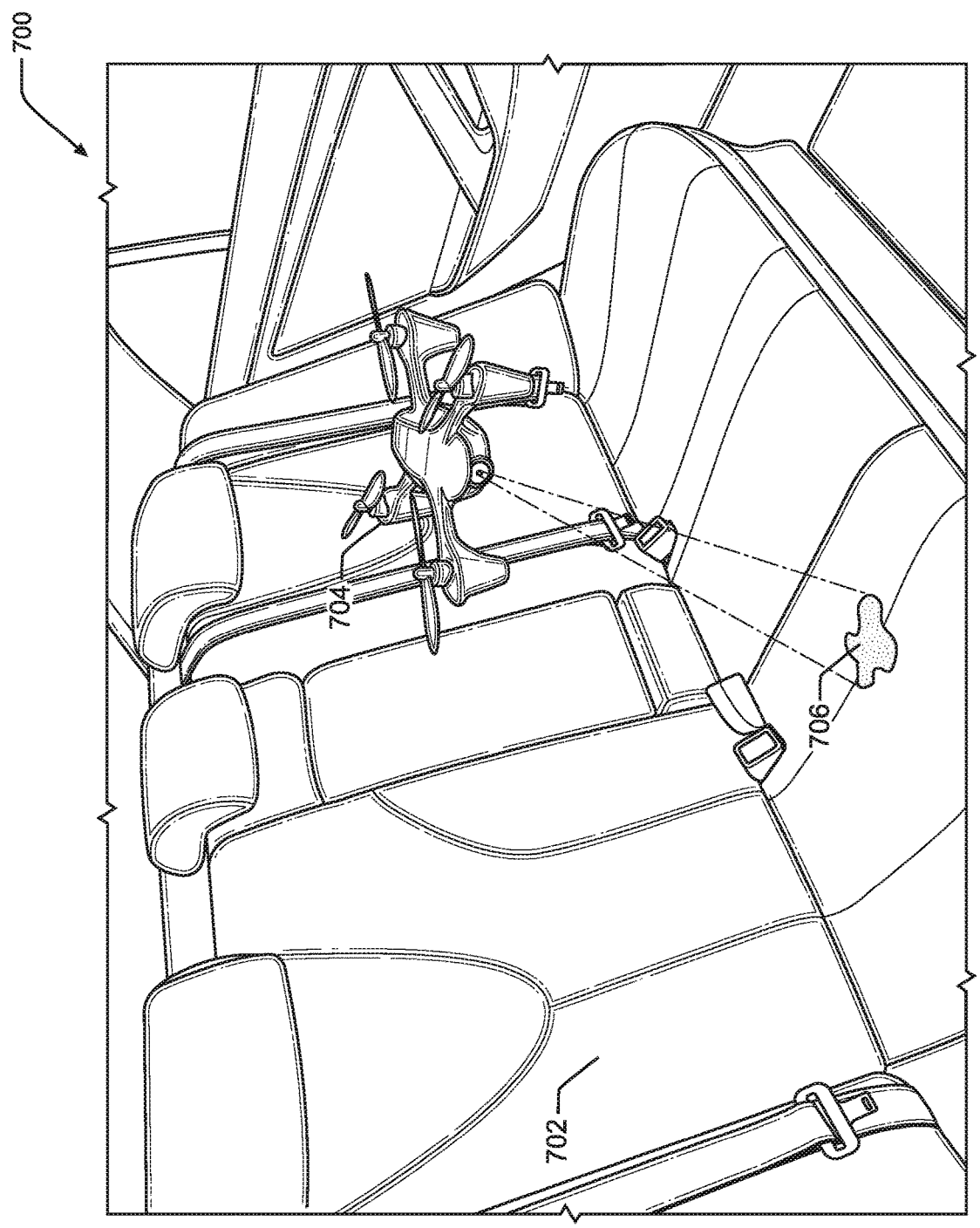
FIG. 7 illustrates an embodiment of a vehicle interior with a unmanned aircraft inside the vehicle.

FIG. 7 illustrates an embodiment of a vehicle interior 700 with a unmanned aircraft 704 maneuvering inside the vehicle. Vehicle interior 700 includes seating surfaces 702 and illustrates a stain 706 on one of the surfaces. As shown in FIG. 7, a camera mounted to unmanned aircraft 704 captures an image of stain 706 and communicates the captured image to a vehicle inspection system associated with the vehicle.

Figure 8:
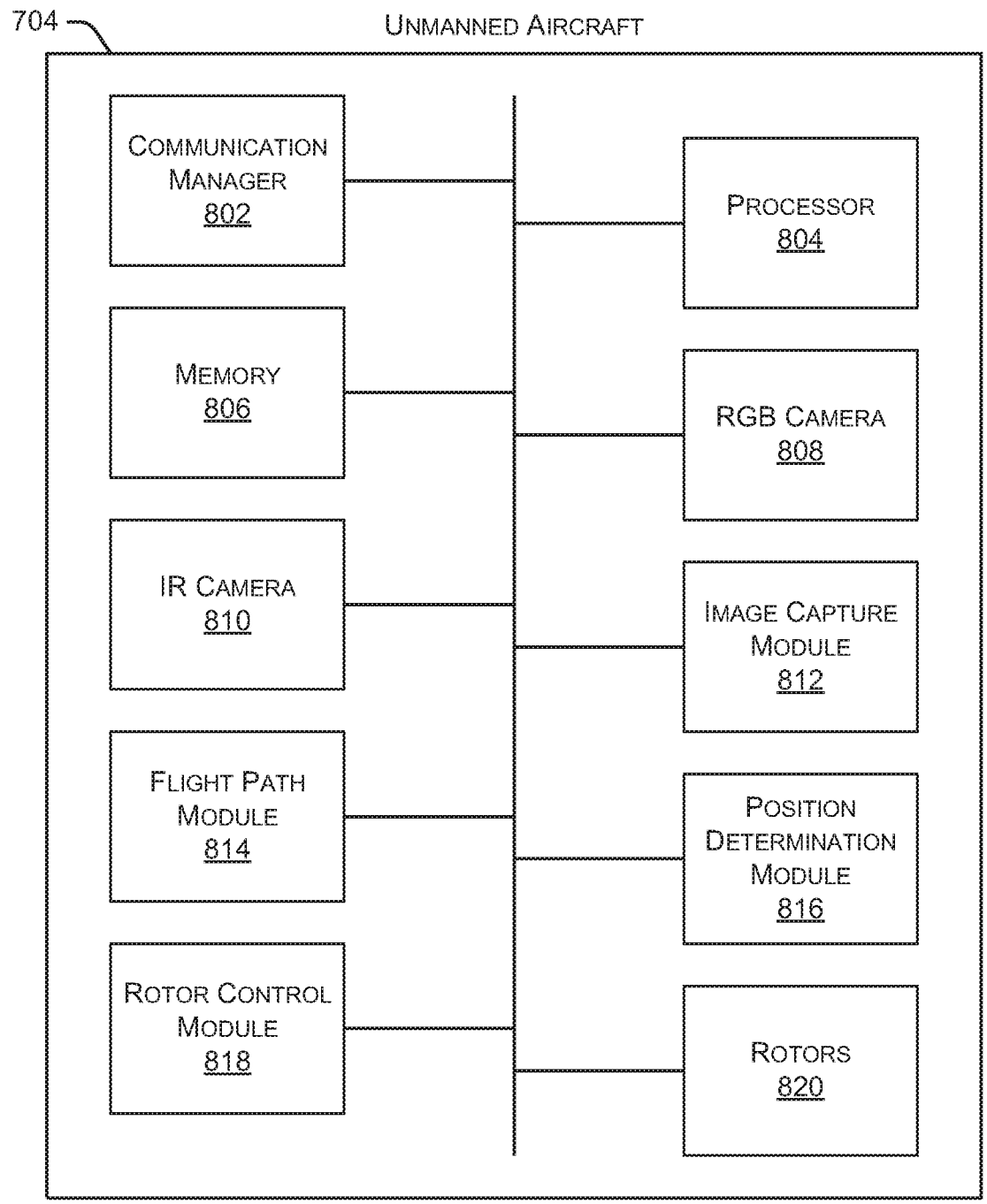
FIG. 8 is a block diagram illustrating an embodiment of an unmanned aircraft.

FIG. 8 is a block diagram illustrating an embodiment of unmanned aircraft 704. As shown in FIG. 8, unmanned aircraft 704 includes a communication manager 802, a processor 804, and a memory 806. Communication manager 802 allows unmanned aircraft 704 to communicate with other systems, such as automated driving/assistance system 102 and vehicle inspection system 104. Processor 804 executes various instructions to implement the functionality provided by unmanned aircraft 704, as discussed herein. Memory 806 stores these instructions as well as other data used by processor 804 and other modules and components contained in unmanned aircraft 704. Additionally, unmanned aircraft 704 includes an RGB camera 808 and an IR camera 810.

Unmanned aircraft 704 also includes an image capture module 812 that captures images from RGB camera 808 and/or IR camera 810. As discussed herein, these captured images may be communicated to vehicle inspection system 104 or other components or systems. A flight path module 814 maintains information related to a pre-defined flight path that the unmanned aircraft 704 attempts to follow. In some embodiments, the flight path information is received from vehicle inspection system 104. A position determination module 816 determines a location of unmanned aircraft 704 within the vehicle. For example, position determination module 816 may analyze visual cues contained in images captured by RGB camera 808 and/or IR camera 810.

A rotor control module 818 controls the operation of multiple rotors 820 associated with unmanned aircraft 704. In some embodiments, unmanned aircraft 704 has three or four rotors 820 that assist unmanned aircraft 704 in flying throughout the vehicle. For example, rotor control module 818 may control the rotational speed of each rotor 820 to steer and maneuver unmanned aircraft 704 throughout the cabin of the vehicle. Thus, rotor control module 818 can assist in maneuvering unmanned aircraft 704 along a particular flight path, avoiding obstacles in the vehicle, and the like. In particular embodiments, one or more of the functions performed by rotor control module 818 are, instead, performed by vehicle inspection system 104, which sends appropriate rotor control instructions to rotor control module 818 for implementation.

In some embodiments, the adaptive flight control process discussed herein determines forces applied to unmanned aircraft 704 as a result of vehicle movement (acceleration, deceleration, turning, etc.) and applied vehicle controls (accelerator, brake, steering, etc.). Based on the forces applied to unmanned aircraft 704, rotor control module 818 can estimate the rotor speed necessary for each rotor to compensate for the applied forces. Rotor control module 818 then adjusts the speed of each of the multiple rotors to maintain unmanned aircraft 704 on a particular flight path.

In some embodiments, the systems and methods discussed herein are also useful in detecting interior vehicle damage, such as torn seating surfaces, broken trim pieces, hanging trim pieces, damaged arm rests, damaged seat belts, and the like.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
    activating an unmanned aircraft inside a vehicle, wherein the unmanned aircraft includes a camera configured to capture images of the vehicle interior;
    accessing, using one or more processors, a flight path for the unmanned aircraft that captures images of specific portions of the vehicle interior;
    receiving data associated with the vehicle's current movement;
    adjusting, using the one or more processors, the flight path to compensate for the vehicle's current movement;
    accessing a clean image associated with a clean vehicle interior;
    receiving, from the unmanned aircraft, a second image associated with the vehicle interior;
    identifying differences between the clean image and the second image; and
    determining a cleanliness of the vehicle interior based on the differences between the clean image and the second image.

2. The method of claim 1, wherein data associated with the vehicle's current movement includes at least one of vehicle acceleration, vehicle deceleration, and vehicle turns.

3. The method of claim 1, wherein determining a cleanliness of the vehicle interior includes determining whether the vehicle interior includes at least one of a stain, dirt, or trash.

4. The method of claim 1, wherein determining a cleanliness of the vehicle interior based on the differences between the clean image and the second image includes subtracting the second image from the clean image.

5. The method of claim 1, wherein adjusting the flight path to compensate for the vehicle's current movement includes receiving vehicle data including at least one of a vehicle speed, a vehicle acceleration, or a vehicle steering signal.

6. The method of claim 1, wherein the unmanned aircraft is activated in response to a passenger exiting the vehicle.

7. The method of claim 1, wherein the unmanned aircraft camera includes an RGB (Red, Green, and Blue) sensor and an IR (Infrared) sensor, and wherein both the RGB sensor and the IR sensor are configured to capture images of the vehicle interior.

8. The method of claim 1, wherein the unmanned aircraft is one of a drone, a nano drone, a mini drone, or a micro drone.

9. The method of claim 1, further comprising determining whether the vehicle interior needs to be cleaned based on determining whether the vehicle interior includes at least one of a stain, dirt, or trash.

10. The method of claim 1, wherein adjusting the flight path includes adjusting the speed of at least one rotor of the unmanned aircraft.

11. The method of claim 1, wherein receiving data associated with the vehicle's current movement includes receiving data associated with activation of at least one of a vehicle brake, accelerator, or steering system.

12. The method of claim 1, wherein the vehicle is an autonomous vehicle.

13. An apparatus comprising:
    a communication manager configured to communicate with an unmanned aircraft in a vehicle;
    a flight path manager configured to access a flight path for the unmanned aircraft;
    an adaptive flight controller coupled to the communication manager and the flight path module, wherein the adaptive flight controller is configured to receive data associated with the vehicle's current movement, and wherein the adaptive flight controller is further configured to adjust the flight path to compensate for the vehicle's current movement; and
    an image processing module configured to:
        access a clean image associated with a clean vehicle interior;
        receive a second image associated with the current vehicle interior;
        identify differences between the clean image and the second image; and
        determine a cleanliness of the vehicle interior based on the differences between the clean image and the second image.

14. The apparatus of claim 13, wherein the adaptive flight controller is further configured to communicate the adjusted flight path to the unmanned aircraft.

15. The apparatus of claim 13, wherein the data associated with the vehicle's current movement includes at least one of a vehicle speed, a vehicle acceleration, or a vehicle steering signal.

* * * * *